US012589584B2

(12) United States Patent (10) Patent No.: US 12,589,584 B2

Bralia et al. (45) Date of Patent: Mar. 31, 2026

(54) METHOD FOR APPLYING A LAYERED TEXTILE TO A METAL SUBSTRATE

(71) Applicant: LAMCOATINGS B.V., Almere (NL)

(72) Inventors: Alessandro Bralia, Usmate Velate (IT); Antonio D'Ortona, Almere (NL)

(73) Assignee: LAMCOATINGS B.V., Almere (NL)

( * ) Notice: Subject to any disclaimer, the term of this patent is extended or adjusted under 35 U.S.C. 154(b) by 412 days.

(21) Appl. No.: 18/019,846

(22) PCT Filed: Aug. 6, 2021

(86) PCT No.: PCT/EP2021/071968
§ 371 (c)(1),
(2) Date: Feb. 6, 2023

(87) PCT Pub. No.: WO2021/245294
PCT Pub. Date: Dec. 9, 2021

(65) Prior Publication Data
US 2023/0278323 A1 Sep. 7, 2023

(30) Foreign Application Priority Data

Aug. 10, 2020 (NL) ..................................... 2026243

(51) Int. Cl.
*B32B 38/00* (2006.01)
*B32B 5/02* (2006.01)
(Continued)

(52) U.S. Cl.
CPC ............ *B32B 38/0036* (2013.01); *B32B 5/02* (2013.01); *B32B 7/12* (2013.01); *B32B 15/082* (2013.01);
(Continued)

(58) Field of Classification Search
CPC ..... B32B 37/02; B32B 37/12; B32B 37/1284; B32B 37/1215; B32B 37/1223;
(Continued)

(56) References Cited

U.S. PATENT DOCUMENTS

| | | | | |
|---|---|---|---|---|
| 4,500,593 A | * | 2/1985 | Weber | ................. A41D 31/085 |
| | | | | 428/394 |
| 4,749,625 A | * | 6/1988 | Obayashi | ............... B32B 15/08 |
| | | | | 442/232 |

(Continued)

OTHER PUBLICATIONS

International Search Report and Written Opinion for WO 2021/245294 (PCT/EP2021/071968), dated Nov. 16, 2021, pp. 1-16.
Search Report for NL 2026243, dated Apr. 21, 2021, pp. 1-11.

*Primary Examiner* — Michael P Wieczorek
(74) *Attorney, Agent, or Firm* — Thomas|Horstemeyer, LLP

(57) ABSTRACT

The present invention relates to a method for applying textile to a plane metal substrate, the method comprising the steps of: providing a coiled plane metal substrate; unwinding the coiled plane metal substrate; applying a further adhesive layer onto a top surface of the plane metal substrate; and laminating a layered laminate comprising a carrier film, an intermediate adhesive layer, and a textile top layer onto the top surface of the plane metal substrate, the carrier film contacting the further adhesive, thereby forming a laminated assembly. The invention further relates to a laminated assembly obtainable by the method.

17 Claims, 1 Drawing Sheet

21

(51) Int. Cl.

| | |
|---|---|
| *B32B 7/12* | (2006.01) |
| *B32B 15/082* | (2006.01) |
| *B32B 15/085* | (2006.01) |
| *B32B 15/09* | (2006.01) |
| *B32B 15/18* | (2006.01) |
| *B32B 27/08* | (2006.01) |
| *B32B 27/12* | (2006.01) |
| *B32B 27/30* | (2006.01) |
| *B32B 27/32* | (2006.01) |
| *B32B 27/36* | (2006.01) |
| *B32B 27/40* | (2006.01) |
| *B32B 37/00* | (2006.01) |
| *B32B 37/12* | (2006.01) |

(52) U.S. Cl.

CPC ............ *B32B 15/085* (2013.01); *B32B 15/09* (2013.01); *B32B 27/08* (2013.01); *B32B 27/12* (2013.01); *B32B 27/304* (2013.01); *B32B 27/32* (2013.01); *B32B 27/36* (2013.01); *B32B 27/40* (2013.01); *B32B 37/156* (2013.01); *B32B 15/18* (2013.01); *B32B 2037/1215* (2013.01); *B32B 2255/06* (2013.01); *B32B 2255/26* (2013.01); *B32B 2262/0276* (2013.01); *B32B 2307/3065* (2013.01); *B32B 2307/7376* (2023.05); *B32B 2309/02* (2013.01); *B32B 2311/30* (2013.01); *B32B 2327/06* (2013.01); *B32B 2367/00* (2013.01); *B32B 2375/00* (2013.01); *B32B 2419/00* (2013.01)

(58) Field of Classification Search

CPC ..... B32B 15/08; B32B 15/082; B32B 15/085; B32B 15/09; B32B 15/14

See application file for complete search history.

(56) References Cited

U.S. PATENT DOCUMENTS

| | | | | |
|---|---|---|---|---|
| 5,486,408 | A * | 1/1996 | Sentendrey | .............. B32B 7/12 442/232 |
| 6,703,329 | B2 * | 3/2004 | Principe | .............. A47G 11/003 428/920 |
| 8,455,075 | B2 * | 6/2013 | Kim | ........................ B32B 15/20 428/40.9 |
| 2004/0097157 | A1 | 5/2004 | Cosentino | |
| 2005/0191920 | A1 * | 9/2005 | Sadato | ................... C08G 18/10 428/319.3 |
| 2011/0020634 | A1 | 1/2011 | Paschkowski et al. | |
| 2012/0238172 | A1 | 9/2012 | Siebert et al. | |
| 2015/0321393 | A1 | 11/2015 | Stapperfenne et al. | |
| 2015/0328863 | A1 * | 11/2015 | Walsh | ................... B32B 38/162 428/447 |
| 2017/0033329 | A1 * | 2/2017 | Shin | ........................ B32B 7/027 |
| 2019/0185628 | A1 | 6/2019 | Eichner et al. | |

* cited by examiner

21

METHOD FOR APPLYING A LAYERED TEXTILE TO A METAL SUBSTRATE

CROSS-REFERENCE TO RELATED APPLICATIONS

This application is the National Stage of International Application No. PCT/EP2021/071968, filed Aug. 6, 2021, which claims priority to NL 2026243, filed Aug. 10, 2020, which are entirely incorporated herein by reference.

The present invention relates to a layered laminate comprising a carrier film, an intermediate adhesive layer, and a textile top layer, to a method for applying textile to a carrier film, to a method for applying textile to a plane metal substrate and to a textile-coated metal substrate.

BACKGROUND ART

Metal surfaces coated with a layer of textile are useful in a wide variety of applications, such as building envelopes, interior partition walls, shipbuilding, automotive, domestic appliances, etc. In the art, these products are created by applying an adhesive to a sheet of metal, after which a sheet of textile may be thermally bonded to the adhesive, for example while applying pressure in a hydraulic press. This batch-wise method of coating individual metal sheets is cumbersome, difficult to automate and not suited for creating large surfaces and high volumes of textile coated metal.

Coil coating of metal surfaces with a layer of textile directly in a coil coating line could be a solution for creating large surfaces of textile coated metal. Coil coating is a continuous and highly automated industrial process for efficiently coating coils of metal. The metal substrate (usually steel, steel with a metallic coating, stainless steel or aluminium) is delivered in coil form from the rolling mills or galvanizing lines. The weight of the coils varies from 5-6 tonnes for aluminium and up to 20 tonnes for steel. The coil is positioned at the beginning of the coil coating line, and is then unwound at a constant speed, passing through various coating processes before being recoiled. Such process may include cleaning, if necessary, and chemical pre-treatment of the metal surface and either one-side or two-side, single or multiple application of paints or coating powders which are subsequently cured. Laminating with permanent plastic films may be carried out as well. Two strip accumulators which may be found at the beginning and the end of the line enable the work to be continuous, allowing new coils to be added (and finished coils removed) by a metal stitching process without having to slow down or stop the line.

Coil coating of textile could for example be carried out by applying a bonding layer onto a metal coil, and subsequently laminating textile from a textile coil onto the bonding layer. However, the present inventors have found that such a process is practically infeasible due to several reasons. First of all, the adhesion between metal and textile is often unsatisfactory. Furthermore, unrolling of the metal coil and the coiled textile (which is often quite deformable) is hard to synchronize, and also the metal and textile often de-align. Finally, application of different types of textiles requires adjustments to the coil coating line because the process has to be tuned to the specific pair of textile and adhesive for the textile, thereby not making it straightforward to switch between different materials.

DESCRIPTION OF THE INVENTION

It is an objective of the present invention to overcome one or more of the abovementioned disadvantages, or at least to provide a useful alternative. Thereto, the present invention provides a layered laminate comprising a carrier film, an intermediate adhesive layer, and a textile top layer, preferably wherein the carrier film and the textile top layer are dimensionally stable at a temperature of at least 150° C., preferably at least 160° C.

The invention further provides a method for applying textile to a plane metal substrate, the method comprising the steps of:

providing a coiled plane metal substrate;

unwinding the coiled plane metal substrate;

applying a further adhesive layer onto a top surface of the plane metal substrate;

laminating a layered laminate according to the invention onto the top surface of the plane metal substrate, the carrier film contacting the further adhesive, thereby forming a laminated assembly.

The invention especially provides a method for applying textile to a plane metal substrate, the method comprising the steps of:

providing a coiled plane metal substrate;

unwinding the coiled plane metal substrate;

applying a further adhesive layer onto a top surface of the plane metal substrate;

laminating a layered laminate comprising a carrier film, an intermediate adhesive layer, and a textile top layer onto the top surface of the plane metal substrate, the carrier film contacting the further adhesive, thereby forming a laminated assembly.

Preferably, the carrier film and the textile top layer of the layered laminate are dimensionally stable at a temperature of at least 150° C., more preferably at least 160° C., such that the layered laminate will not substantially deform during laminating.

In the layered laminate, the textile is secured to the carrier film. The carrier film provides support and stability to the otherwise very flexible and deformable textile. The carrier film and the textile top layer are preferably dimensionally stable (i.e. maintaining their original dimensions when subjected to changes in temperature up to a defined temperature) at a temperature of at least 150° C., preferably at least 160° C., such as at least 180° C., or preferably at least 200° C., which is a temperature in the range of, and preferably above the laminating temperature used in a coil coating line.

Dimensional stability in the present invention means that the dimensions, especially the in-plane dimensions of a layer, film, or laminate, i.e. the length and width, do not deviate by more than 5%, preferably not more than 1%, most preferably not more than 0.1% from their original value after being exposed to a defined temperature for a defined amount of time, wherein the deviation percentage is equal to final dimension value minus original dimension value, divided by original dimension value, multiplied by 100%.

Dimensional stability may for example be determined according to ASTM D1204, with the time being defined by the application in which the dimensional stability is required. In the case of the present invention, the time is defined by the time required for executing the lamination step of the invention. Typically, the aforementioned lamination process takes up to seconds. Thus, preferably, the carrier film and textile top layer are dimensionally stable at the mentioned temperatures (at least 150° C., preferably at least 160° C., such as at least 180° C., or preferably at least 200° C.) for at least 10 seconds, preferably at least 30 seconds, more preferably at least 60 seconds, most preferably at least 180 seconds.

Due to the dimensional stabilization of the carrier film and the textile top layer, the layered laminate is also dimensionally stable under the same conditions as mentioned above, and therefore it will not substantially deform during laminating the layered laminate onto a plane metal substrate in a coil coating line. This means, that besides some minor deformation occurring due to the application of the laminate onto a plane metal substrate, whereby the carrier film is adhered to the plane metal substrate, the layered laminate retains its shape and will not substantially shrink, nor will its in-plane dimensions substantially change in any other way. No substantial change/shrinkage in the context of this application means that the dimensions do not change by more than 5%, preferably not more than 1%, most preferably not more than 0.1% with respect to the original value. Therefore, it is possible to simultaneously unwind a coiled plane metal substrate and the coiled layered laminate in a coil coating line without the synchronization and de-alignment issues that arise when directly laminating textile from a coil onto a plane metal substrate. The traverse movements of the metal and layered laminate allow an industrial production, which is not possible when textile is directly coated on metal in a batch wise process.

Moreover, because the carrier film may be chosen to be made from a material which is commonly used on coil coating lines, the layered laminate may easily be laminated onto a coil of metal in a coil coating line without significantly having to change the settings of the coil coating line, such as the temperature and the adhesive used for adhering the carrier film to the metal substrate (called the further adhesive layer in this application). For example, a range of layered laminates may be produced which differ in the type and/or appearance of the textile top layer, but which all have the same carrier layer. Due to the identical carrier layer, these different layered laminates may all be applied in a coil coating process which uses the same settings. This results in a very versatile production possibility of textile-coated metal substrates.

The layered laminate may be produced by lamination in a relatively small textile laminating line (as compared to a coil coating line). In order to produce the layered laminate, the present invention also provides a method for applying textile to a carrier film, the method comprising laminating together a carrier film, an intermediate adhesive layer and a textile top layer, wherein the carrier film and the textile top layer are dimensionally stable at a temperature of at least 150° C., preferably at least 160° C., resulting in a layered laminate according to the invention. The intermediate adhesive layer is laminated between the carrier film and the textile top layer.

The method for applying textile to a carrier film may be executed in two passages, and may then for example comprise the steps of
 providing a coiled carrier film, a coiled intermediate adhesive layer and a coiled textile layer;
 simultaneously unwinding the coiled intermediate adhesive layer together with one of the coiled carrier films and the coiled textile layer, preferably the coiled carrier film;
 laminating the intermediate adhesive layer together with either the carrier film or the textile layer, preferably the carrier film, resulting in a double layered laminate,
 unwinding the remaining coiled textile layer or coiled carrier film, preferably the coiled textile layer, and further laminating this onto the double layered laminate, resulting in a layered laminate comprising a carrier film, an intermediate adhesive layer, and a textile top layer.

The method for applying textile to a carrier film may also be executed in a single passage, and may then for example comprise the steps of
 providing a coiled carrier film, a coiled intermediate adhesive layer and a coiled textile layer;
 simultaneously unwinding the carrier film, the intermediate adhesive layer and the textile layer;
 laminating the three layers in a single passage, the intermediate adhesive layer being laminated between the carrier and the textile, resulting in a layered laminate comprising a carrier film, an intermediate adhesive layer, and a textile top layer.

The method for applying textile to a carrier film may be performed in a textile laminating line. In the textile laminating line, smaller batches may be used, and the textile is much easier to handle. For example, in the textile laminating line, issues with synchronization and de-alignment, if present, can easily be dealt with by a single operator at the line immediately upon noticing any such issues. The operator may e.g. manually adjust the process or interrupt the procedure in order to immediately solve the issue. A coil coating line on the other hand is much bigger and once running, the coil coating procedure cannot be stopped and/or adjusted very easily. Any adjustment to the process results in a large amount of down-time, i.e. up to many hours, and therefore a great loss of production. Moreover, the adjustments result in undesirable additional scrap material.

Production on the textile laminating line may furthermore also be relatively slower than on a coil coating line, which allows the textile to sink into the adhesive for providing strong adhesion by physical bonding. Running a coil coating line at the required slow speeds would result in a very low production rate, making the process not viable economically.

Finally, in the textile laminating line, the temperature may easily be adjusted to suit the optimal processing temperature of the intermediate adhesive layer. This optimal processing temperature usually is lower than 160° C., i.e. lower than the typical temperature used in a coil coating line.

The method for applying textile to a plane metal substrate according to the invention is preferably performed in a coil coating line. The coiled plane metal substrate or simply metal coil can be any metal, which is suitable to be used in a coil coating process. It may for example be cold rolled steel, stainless steel, metallic coated steel (i.e. hot dip galvanized steel), aluminium, etc. The coil may have a width of maximally 1.8 m, typically about 1.0 to 1.5 m. The plane metal substrate preferably has a thickness of between 0.17 mm to 3.0 mm. At these thicknesses, the metal can suitably be treated by a coil coating process such as the method for applying textile to a plane metal substrate according to the invention. More preferably, the plane metal substrate, i.e. metal strip, has a thickness of between 0.30 mm and 1.50 mm, as this is the optimal thickness for a coil coating process. After the textile application process, the laminated assembly may be processed, i.e. cut, in slit coils or plane sheets. There are two types of cutting, referred to as slitting, to produce slit coils: log slitting and rewind slitting. In log slitting the coil is treated as a whole (the 'log') and one or more slices are taken from it without an unrolling/re-reeling process. In rewind slitting the web (laminated assembly) is unwound and run through a machine, passing through knives before being rewound on one or more shafts to form narrower rolls. Sheets may be formed by further cutting the rolled laminated assembly forming the coil or the slit coil in the desired dimensions.

The plane metal substrate may optionally be pre-treated, for example by degreasing, optionally followed by washing, rinsing, passivation and drying, and/or pre-treatment may comprise chemical pre-treatment based on chrome VI, chrome III or a chrome free passivant. Examples of chrome free passivants are titanium and/or zirconium compounds, particularly complex fluorides of these elements. Additionally or alternatively, a metal substrate primer (i.e. a primer applied on the plane metal substrate, preferably on the top surface of the plane metal substrate) may be used to pre-treat the metal surface before application of the adhesive layer.

Preferably, the top surface of the plane metal substrate is provided with a metal substrate primer. Suitable primers comprise e.g. epoxy, polyester, acrylics, polyurethane, etc. Preferably, the metal substrate primer comprises a polyester resin. The metal substrate primer may be cured by heating the metal coil to a temperature of more than 180° C. The primer may be applied in a layer ranging from 1 μm to 20 μm, preferably from 3 μm to 15 μm, more preferably from 5 μm to 10 μm.

The further adhesive layer may comprise any suitable adhesive for adhering the carrier film to the plane metal substrate, such as for example a polyester based adhesive.

In order to laminate the layered laminated onto the plane metal substrate, the plane metal substrate is preferably provided with the further adhesive and then heated for allowing the further adhesive layer to crosslink. For example, during heating the PMT (peak metal temperature) may reach about 230° C. The substrate is then preferably removed from the heat source, and optionally allowed to cool, after which the layered laminate is laminated on top of the further adhesive. During lamination, the temperature of the layered laminate preferably reaches at most about 170° C., preferably at most 160° C.

The carrier film preferably comprises a plastic, i.e. a synthetic or semi-synthetic organic compound. The production of the carrier film may have been performed by calendering, i.e. by using a series of cylinders applying continuous heat and pressure to laminate a molten mass of PVC into a thin plastic film to the desired thickness. A calendering machine usually has several cylinders, such as e.g. four cylinders, in a temperature range of 170 to 210° C. (usually each cylinder is at another temperature). By a careful adaptation of the tangent speed of the take-off cylinder to that of the last calender cylinder, internal stress within the film can be avoided. This results in dimensional stabilization of the carrier film at a temperature of at least 170° C., preferably at least 180° C., such as at least 200° C. Other known processes whereby internal stress is avoided may be used instead.

In order to provide optimal support and stability to the otherwise very flexible and deformable textile, the carrier film preferably possesses the following mechanical and dimensional properties.

Preferably, the carrier film has a longitudinal tensile strength, i.e. an in plane tensile strength in a direction parallel to the transportation direction of the carrier film during unwinding and rewinding of a coil (i.e. roll) of carrier film, of at least 30 MPa, most preferably of at least 36 MPa, as measured by ASTM D638.

Preferably, the carrier film has a longitudinal elongation at break of at least 100%, most preferably of at least 140%, as measured by ASTM D638.

Preferably, the carrier film has a thickness of between 30 and 200 μm. At lower thicknesses, the carrier film may not provide adequate support, whereas at higher thicknesses the flexibility decreases, and therefore the rewinding of the layered laminate onto a coil, or the rewinding of the laminated assembly onto a coil may become too difficult, resulting in deformation and possibly delamination. Furthermore, higher thicknesses require more material, which results in higher costs, and short and more difficult to laminate rolls, which is not preferable. More preferably, the carrier film has a thickness of between 60 and 120 μm, which provides an optimum between the provided support and the flexibility.

In the transverse direction, i.e. the direction perpendicular to the transportation direction of the carrier film during unwinding and rewinding of a coiled/rolled carrier film, the carrier film preferably has a tensile strength of at least 35 MPa, and an elongation at break of at least 150%.

Preferably, the carrier film is flame retardant. When the carrier film is flame retardant, the resulting product, i.e. the resulting laminated assembly (in other words textile-coated metal substrate), may be made suitable for specialty applications, for example in marine environments, where flame retardant properties are required. Such demands for flame retardancy are for example written down in: Marine Equipment Directive (MED) 2014/90/EU, Commission Implementing Regulation (EU) 2019/1397, IMO RES MSC 307 (88) (2010 FTP CODE)—parts 2 and 5, IMO RES 653 (16), ISO 5659-2:2006, ISO 19702:2006, ISO 5658-2:2006 as modified in part 5, and EN/ISO 1716:2010. Preferably the term flame retardant is defined by an object or film or laminate being flame retardant according to any one of, more preferably all of, these norms.

Preferably, the carrier film comprises a flame-retardant material. The flame retardant material may for example be an additive, such as a low molecular weight organic or inorganic or inorganic additive, for example a mineral (e.g. aluminium hydroxide, magnesium hydroxide, red phosphorus, etc.), organohalogen compound (e.g. decabromodiphenyl ether, tetrabromobisphenol A, etc.), organophosphorus compound (e.g. triphenyl phosphate, tricresyl phosphate, etc.), or an organic compound (e.g. carboxylic acid or dicarboxylic acid), or alternatively, the flame retardant material may be an intrinsically flame retardant polymer, such as polyvinylchloride (PVC). The carrier film may also comprise a combination of in intrinsically flame-retardant polymer and a low molecular weight organic or inorganic flame retardant additive.

More preferably, the carrier film comprises PVC. Besides being flame retardant, this polymer also has the advantage that it is commonly used on coil coating lines, and therefore the layered laminate may easily be applied in a coil coating line commonly used with PVC without significantly having to change the settings of the coil coating line, such as the temperature and the adhesive used for adhering the carrier film to the metal substrate. Most preferably, the carrier film consists essentially of PVC. The phrase consists essentially of in this respect should be taken to mean at least 80 wt %, preferably at least 90 wt %, more preferably at least 95 wt %, even more preferably at least 99 wt %, most preferably at least 99.9 wt % of the carrier film is PVC.

Additionally or alternatively, the carrier film may comprise a polyester, polyethylene terephthalate (PET), polyethylene terephthalate glycol (PET-G), polypropylene (PP), and/or combinations thereof. The advantage of these materials is that films with a lower thickness may be used, which results in cheaper solutions.

Preferably, the intermediate adhesive layer comprises a hot-melt adhesive. Hot melt adhesives are a form of thermoplastic adhesive and usually consist of one base material with various additives. The natures of the polymer and the additives used to increase tackiness (called tackifiers) influence the nature of mutual molecular interaction and interaction with the substrate. Hot melt adhesives provide several advantages over solvent-based adhesives. Volatile organic compounds are reduced or eliminated, and the drying or curing step is eliminated as well. More preferably, the intermediate adhesive layer consists essentially of a hot-melt adhesive. The phrase consists essentially of in this respect should be taken to mean at least 70 wt %, preferably at least 90 wt %, more preferably at least 95 wt %, even more preferably at least 99 wt %, most preferably at least 99.9 wt % of the intermediate adhesive layer consists of the hot-melt adhesive.

Preferably, the hot-melt adhesive has a melting temperature of between 110 and 160° C., more preferably of between 130 and 140° C.

Preferably, the hot-melt adhesive is a polyester based adhesive, more preferably a flame-retardant polyester based adhesive.

Preferably, the hot-melt adhesive has a weight of between 10-90 g/m². At lower weights, the textile cannot be adequately pressed into the adhesive layer, and adhesion may be insufficient, whereas at higher weights, processing becomes more difficult. For example, more heat has to be applied to melt the hot-melt and to apply the textile in the textile coating process. Furthermore, the total thickness of the layered laminate becomes too large. Besides the cost of using more material than necessary, this may for example impede sufficient rolling of the layered laminate onto a coil. More preferably, the intermediate adhesive layer has a weight of between 12-75 g/m² as this provides for the optimum balance between adhesion and amount of material used.

A textile is a flexible material consisting of a network of natural or artificial fibres, which fibres have been spun into long strands of yarn or thread. Textiles are made from many materials, with four main sources: animal (e.g. wool, silk), plant (e.g. cotton, flax, jute, bamboo), mineral (e.g. asbestos, glass fibre), and synthetic (e.g. nylon, polyester, acrylic, rayon). The textile of the textile top layer of the present invention may be any suitable textile may be made from any of the before mentioned sources and materials. Furthermore, there are many production methods for producing the above-mentioned network of fibres, among which the methods disclosed below.

Weaving is a textile production method which involves interlacing a set of longer threads (called the warp) with a set of crossing threads (called the weft).

Knitting, looping, and crocheting involve interlacing loops of yarn, which are formed either on a knitting needle, needle, or on a crochet hook, together in a line.

Spread tow is a production method where the yarn is spread into thin tapes, and then the tapes are woven as warp and weft. This method is mostly used for composite materials; spread tow fabrics can be made in carbon, aramide, etc.

Braiding or plaiting involves twisting threads together into cloth. Knotting involves tying threads together and is used in making tatting and macrame.

Lace is made by interlocking threads together independently, using a backing and any of the methods described above, to create a fine fabric with open holes in the work.

Interlacing a secondary yarn through woven cloth, creating a tufted layer known as a nap or pile is commonly used for producing carpets, rugs, velvet, velour, and velveteen.

Felting involves pressing a mat of fibres together and working them together until they become tangled.

Nonwoven textiles finally, are manufactured by the bonding of fibres to make fabric. Bonding may be thermal or mechanical, or adhesives can be used.

Bark cloth is made by pounding bark until it is soft and flat.

The type of fibre network of the textile top layer of the present invention is not particularly limited and may be any one of the network types disclosed above.

Preferably, the textile top layer has been dimensionally stabilized at a temperature of between 160 and 200° C., most preferably of between 180 and 200° C. Due to the heat stabilization, the textile will not significantly deform during production of the layered laminate, nor will it deform during the method for surface coating a plane metal substrate. Heat stabilization may for example have been performed in a stenter device. This is a special oven used in fabric processing for drying and heat-treating fabric after wet processing. It consists of heated chambers and is adjustable to the width of the fabric being treated. The fabric is fed into the heated chamber supported at either selvedge as it is moved through the drying chambers. The input and output speed of the fabric is closely controlled, as is the output width, determining the moisture content of the fabric after drying and the dimensional stability. After heat stabilization, the dimensions of the textile are stable at any temperature below the stabilization temperature.

Preferably, the textile top layer is flame retardant. For example, the textile may be flame retardant due to the presence of a flame-retardant finish or coating on top of the textile layer or surrounding the textile fibres.

More preferably, the textile top layer has been prepared from an intrinsically flame-retardant fibre. Intrinsically flame retardant fibres may be prepared by either copolymerizing a polymer with a flame retardant monomer, or by introduction of a flame retardant additive during extrusion of the polymer. Most preferably, the intrinsically flame-retardant fibre is a polyester fibre, such as a polyester fibre wherein the polyester has been copolymerized or formulated with a flame retardant comonomer, such as an organophosphorus compound. Fibres given an additional flame protection finish can lose this protection as a result of wear, ageing or frequent washing. Intrinsically flame-retardant fibres are inherently flame retardant. As a result, materials made from these fibres and filament yarns are likewise permanently flame retardant. This is important from an ecological viewpoint as well. Intrinsically flame-retardant fibres require no additional, environmentally damaging fire protection treatment such as that required by normally combustible materials. Therefore, very low levels of toxic fumes are emitted in the event of a fire compared with other materials. In a fire, there is a greater danger of suffocation from smoke fumes than there is a risk of injury from flames.

Preferably, the textile top layer is or has been treated with an anti-stain agent, preferably a fire-resistant anti-stain agent. This anti-stain agent may be applied at any time in the process, it may for example have been applied on the textile top layer before performing the method for applying textile to a carrier film, or the anti-stain agent may be applied to the layered laminate before performing the method for applying textile to a plane metal substrate. The anti-stain agent may even be applied to the laminated assembly.

The method for applying textile to a plane metal substrate may further comprise applying a backing coating to a bottom surface of the coiled plane metal substrate. Different types of back coats can be applied depending on the customer demand and the kind of metal substrate. A polyester primer is a common choice. The backing coating may for example be applied before the lamination process.

The laminated assembly of the invention, which may be in the form of a coil or slit coil, may be cut into textile coated metal sheets. These metal sheets may be formed into their final shape by cold bending and applied in a product.

The invention further provides a textile-coated metal substrate, for example obtainable by the method for applying textile to a plane metal substrate of the invention, the textile-coated metal substrate comprising a plane metal substrate, a further adhesive layer, and a layered laminate according to the invention.

The invention further provides a product comprising a textile-coated metal substrate, such as an interior building envelope, interior partition wall element, noise shielding panel, or appliance panel. In particular, the invention relates to such a product for use in a marine environment.

DETAILED DESCRIPTION OF THE FIGURES

Figure 1:
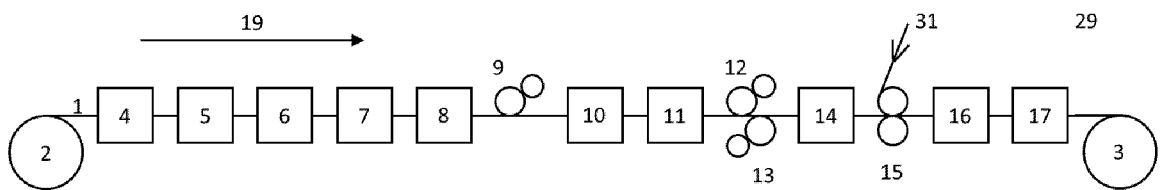
FIG. 1: Schematic picture of a coil coating line.

FIG. 1 depicts a typical coil coating line for carrying out a process according to the invention. In the embodiment shown, a coil 2 of a plane metal substrate 1 is unwound and transported through the line in transport direction 19. The substrate is degreased in degreasing zone 4, washed in washing zone 5, rinsed in rinsing zone 6, and subsequently passivated and dried in passivation zone 7 and drying zone 8, respectively. A primer 23 is applied by reverse roller coat in zone 9, cured by heating in primer heating zone 10, and cooled with water in primer cooling zone 11. In the depicted embodiment, an adhesive 24 and a back-coat 30 are applied simultaneously in adhesive and back-coat coating zones 12 and 13, respectively. Both the adhesive 24 and back-coat 30 are applied by reverse roller coat. Subsequent heating is performed in adhesive heating zone 14. The layered laminate 31 is laminated onto the metal substrate 1 in lamination zone 15. Subsequent cooling is performed by cooling with water in laminate cooling zone 16, followed by drying in laminate drying zone 17. The metal substrate is rewound onto coil 3.

Figure 2:
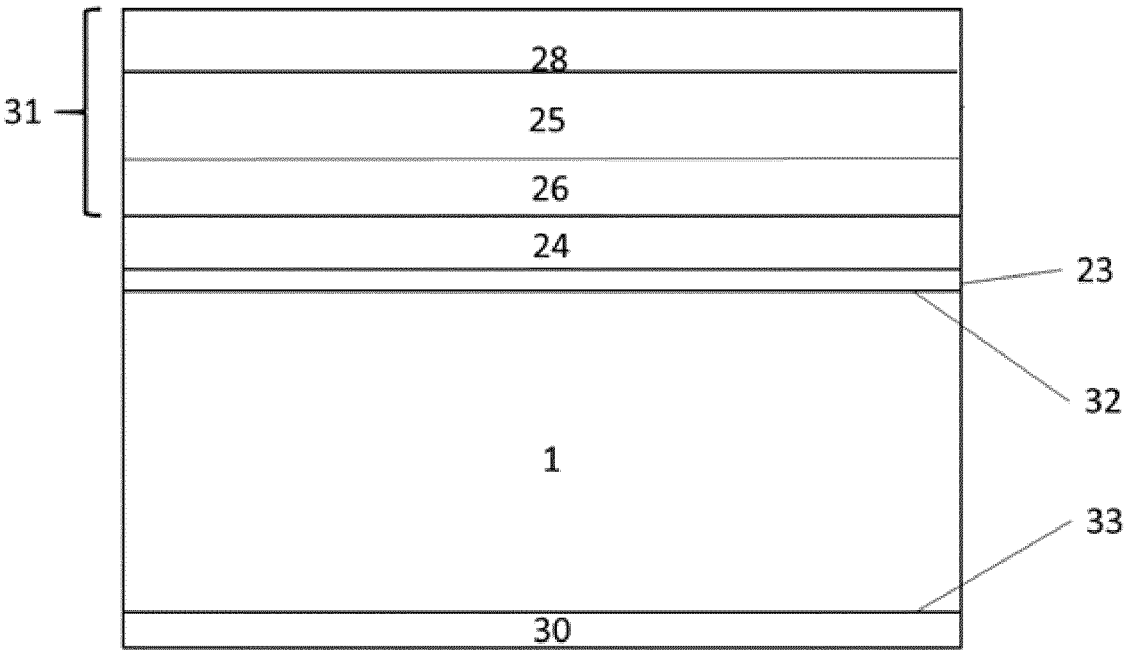
FIG. 2: Schematic picture of a laminated assembly according to the invention.

FIG. 2 depicts an embodiment of a laminated assembly 21 according to the invention. Shown are the plane metal substrate 1, of which a first surface 32 is subsequently covered by a layer of optional metal substrate primer 23, further adhesive layer 24, and layered laminate 31. The second surface 33 is covered by a backing coating 30. Layered laminate 31 comprises in order layers 26, 25 and, and 28, i.e. carrier film 26, intermediate adhesive layer 25, and textile top layer 28.

Materials

Textile—An intrinsically flame retardant weaved polyester textile with a width of 1.5 m and a weight of 140 g/m².

Rigid PVC—Commercially available rigid PVC with a thickness of 100 μm and a width of 1.5 m.

Intermediate adhesive—Web of a hot-melt copolyester with a melting temperature between 128 and 138° C., and a weight of 12-75 g/m².

Adhesive—Commercially available polyester based adhesive.

Example 1

Layered Laminate

The textile was heat stabilized in a stenter device at a temperature of 180° C.

The PVC was calendered at a temperature of 160-210° C. over several cylinders resulting in a stabilized PVC sheet with a thickness of 100 μm.

The textile and PVC were laminated together with the intermediate hot-melt layer in between in a single passage at a temperature of about 140° C.

Laminated Assembly

A coil of galvanized steel was unwound, degreased and pre-treated by a passivant liquid; a primer was applied by using a reverse roll coating process typically at a line speed of m/min resulting in a film thickness of 8 μm. The primer was cured at a temperature of up to 232° C. for a total of 30 sec. Then the coil was cooled down by water and dried up. A polyester based adhesive was applied in a film thickness of 8 μm by using a reverse roll coating process at a line speed of 20 m/min, curing it up to 232° C. for a total of 30 sec. Then the layered laminate was laminated onto the adhesive with the PVC film contacting the adhesive immediately outside the oven. Then the coil was cooled down by water and dried up before being rewound.

The resulting product was tested with various procedures and was found to have the following properties:

| Property | Norm | Result |
|---|---|---|
| Resistance to bending (T-bend) | EN 13523-7 | ½ T |
| Resistance to rapid deformation | ASTM D2794-93 (Reap. 2010) | No detachment or film breaking |
| Salt spray fog resistance | EN 13523-8/ASTM B117-16 | CRS Support: 200 hours HDG Support: 500 hours |

The invention furthermore relates to the following clauses:

1. Layered laminate comprising a carrier film, an intermediate adhesive layer, and a textile top layer, wherein the carrier film and the textile top layer are dimensionally stable at a temperature of at least 150° C., preferably at least 160° C.

2. Layered laminate according to clause 1, wherein the carrier film has been dimensionally stabilized by calendering the carrier film, preferably by calendering at a temperature of at least 150° C., preferably at least 160° C., such as between 170 and 210° C.

3. Layered laminate according to clause 1 or 2, wherein the carrier film has a longitudinal tensile strength of at least 30 MPa, most preferably at least 36 MPa.

4. Layered laminate according to any one of the preceding clauses, having a flexibility according to EN13523/7 of at most ½ T.

5. Layered laminate according to any one of the preceding clauses, wherein the carrier film has a longitudinal elongation at break of at least 100%, most preferably of at least 140%.

6. Layered laminate according to any one of the preceding clauses, wherein the carrier film has a thickness of between 30 and 200 µm, most preferably of between 60 and 120 µm.

7. Layered laminate according to any one of the preceding clauses, wherein the carrier film comprises a flame-retardant material, preferably wherein the carrier film comprises polyvinyl chloride.

8. Layered laminate according to any one of the preceding clauses, wherein the carrier film comprises a polyester, PET, PET-G, and/or PP.

9. Layered laminate according to any one of the preceding clauses, wherein the intermediate adhesive layer comprises a hot-melt adhesive.

10. Layered laminate according to clause 9, wherein the hot-melt adhesive has a melting temperature of between 110 and 160° C., preferably of between 130 and 140° C.

11. Layered laminate according to clause 9 or 10, wherein the hot-melt adhesive is a polyester based adhesive, plastisol based adhesive, or polyurethane based adhesive.

12. Layered laminate according to any one of the preceding clauses, wherein the intermediate adhesive layer is flame-retardant.

13. Layered laminate according to any one of the preceding clauses, wherein the textile top layer has been dimensionally stabilized at a temperature of between 150 and 200° C., preferably between 160 and 200° C., most preferably of between 180 and 200° C.

14. Layered laminate according to any one of the preceding clauses, wherein the textile top layer is flame retardant.

15. Layered laminate according to any one of the preceding clauses, wherein the textile top layer comprises an intrinsically flame-retardant fibre, preferably an intrinsically flame retardant polyester fibre.

16. Layered laminate according to any one of the preceding clauses, wherein the textile top layer comprises an anti-stain agent, preferably a flame-retardant anti-stain agent.

17. Method for applying textile to a carrier film, the method comprising laminating together a carrier film, an intermediate adhesive layer and a textile top layer, wherein the carrier film and the textile top layer are dimensionally stable at a temperature of at least 150° C., preferably at least 160° C., resulting in a layered laminate according to any one of clauses 1-16.

18. Method according to clause 17, wherein laminating is performed in at most 2 passages, and preferably in a single passage.

19. Method for applying textile to a plane metal substrate, the method comprising the steps of:
providing a coiled plane metal substrate;
unwinding the coiled plane metal substrate;
applying a further adhesive layer onto a top surface of the plane metal substrate;
laminating a layered laminate according to any one of clauses 1-16 onto the top surface of the plane metal substrate, the carrier film contacting the further adhesive, thereby forming a laminated assembly.

20. Laminated assembly obtainable by the method of clause 19, the laminated assembly comprising
a plane metal substrate,
a further adhesive layer,
a layered laminate according to any one of the clauses 1-16.

21. Product comprising a laminated assembly according to clause 20.

22. Product according to clause 21, which is an indoor building envelope, interior partition wall element, noise shielding panel, or appliance panel.

The invention claimed is:

1. A coil coating method for applying a textile to a plane metal substrate, the method comprising the steps of:
providing a coiled plane metal substrate, the substrate having a thickness of between 0.17 mm to 3.0 mm;
providing a coiled layered laminate comprising a carrier film, an intermediate adhesive layer, and a textile top layer;
unwinding the coiled plane metal substrate and the coiled layered laminate;
applying a further adhesive layer onto a top surface of the plane metal substrate;
laminating the layered laminate onto the top surface of the plane metal substrate, the carrier film contacting the further adhesive, thereby forming a laminated assembly.

2. The method according to claim 1, wherein the carrier film and the textile top layer of the layered laminate are dimensionally stable according to ASTM D1204 at a temperature of at least 150° C. during laminating, such that the dimensions of the layered laminate will not deviate by more than 5% from their original value.

3. The method according to claim 1, wherein the carrier film has been dimensionally stabilized by calendering the carrier film, optionally by calendering at a temperature of at least 150° C. or at least 160° C., or between 170 and 210° C.

4. The method according to claim 1, wherein the carrier film has a thickness of between 30 and 200 µm, optionally between 60 and 120 µm.

5. The method according to claim 1, wherein the carrier film comprises a flame-retardant material.

6. The method according to claim 5, wherein the carrier film comprises polyvinyl chloride.

7. The method according to claim 1, wherein the carrier film comprises a polyester, PET, PET-G, and/or PP.

8. The method according to claim 1, wherein the intermediate adhesive layer comprises a hot-melt adhesive.

9. The method according to claim 8, wherein the hot-melt adhesive is a polyester based adhesive, plastisol based adhesive, or polyurethane based adhesive.

10. The method according to claim 8, wherein the hot-melt adhesive has a melting temperature of between 11° and 160° C., optionally between 130° and 140° C.

11. The method according to claim 1, wherein the intermediate adhesive layer is flame-retardant.

12. The method according to claim 1, wherein the textile top layer has been heat stabilized at a temperature of between 15° and 200° C.

13. The method according to claim 12, wherein the textile top layer has been heat stabilized at a temperature of between 160 and 200° C., optionally between 18° and 200° C.

14. The method according to claim 1, wherein the textile top layer is flame retardant.

15. The method according to claim 14, wherein the textile top layer comprises an intrinsically flame-retardant fibre, optionally an intrinsically flame retardant polyester fibre.

16. The method according to claim 1, wherein the textile top layer comprises an anti-stain agent.

17. The method according to claim 16, wherein the textile top layer comprises a flame-retardant anti-stain agent.

\* \* \* \* \*